United States Patent Office 3,109,003
Patented Oct. 29, 1963

3,109,003
LOWER ALKYL RESERPATE-18-[α-METHYL-β-(3,4,5-TRIMETHOXYPHENYL)]-ACRYLATE
Jacob Szmuszkovicz, Portage Township, Kalamazoo County, and Richard V. Heinzelman, Kalamazoo Township, Kalamazoo County, Mich., assignors to The Upjohn Company, Kalamazoo, Mich., a corporation of Delaware
No Drawing. Filed Oct. 24, 1962, Ser. No. 232,883
2 Claims. (Cl. 260—287)

The present invention is concerned with physiologically active chemical compounds related to reserpine and is more particularly concerned with methyl reserpate-18-[α-methyl-β-(3,4,5-trimethoxyphenyl)]-acrylate represented by the following formula:

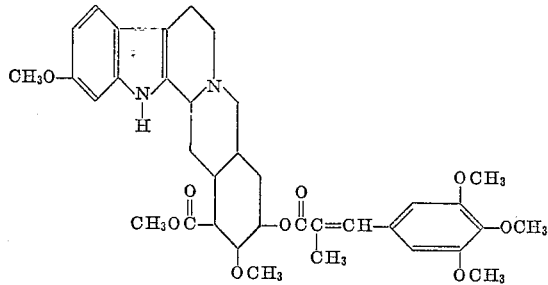

It is an object of the present invention to provide methyl reserpate - 18 - [α - methyl - β - (3,4,5 - trimethoxyphenyl)]-acrylate which is a physiologically active agent of high potency having hypotensive and sedative properties. The compound of the present invention can be substituted for reserpine or reserpine-like compounds in known pharmaceutical compositions for animal therapy such as tablets, injectables, and elixirs which contain such compounds. Reserpine and reserpine-like compounds are known to be effective in human therapy but the compound of the invention has not been shown to be safe and effective for this purpose although there is an expectation of interest in this respect. Other objects and uses of the present invention will be apparent to one skilled in the art.

The methyl reserpate - 18 - [α - methyl - β - (3,4,5 - trimethoxyphenyl)]-acrylate of the present invention is obtained by esterification of methyl reserpate to introduce the α-methyl-β-(3,4,5-trimethoxyphenyl)-acrylate radical, as more fully illustrated by the example below. The preferred esterifying agent is α-methyl-β-(3,4,5-trimethoxyphenyl)-acryloyl chloride. However, if desired, the acid bromide, or the acid anhydride, or other α-methyl-β-(3,4,5-trimethoxyphenyl)-acrylic acid compound suitable for esterification of methyl reserpate can be employed, all those compounds being prepared by conventional procedures. Within the scope of this invention is included the methyl reserpate-18-[α-methyl-β-(3,4,5-trimethoxyphenyl)]-acrylate free base and acid addition salts thereof such as the sulfates, hydrochloride, phosphates, hydrobromide, hydroiodide, acetate, propionate, benzoate, salicylate, maleates, succinates, citrates, phenylacetate, α- and β-phenylpropionates, β-cyclopentylpropionate, etc.

The following example is illustrative only and is not to be construed as limiting the scope of the present invention.

Example 1

A solution of 8.1 grams (0.03 mole) of α-methyl-β-(3,4,5-trimethoxyphenyl)-acryloyl chloride, prepared by reaction of the free acid [Hey, Quart. J. Pharmacy and Pharmacology, 20, 129 (1947)] with thionyl chloride, is added to a solution of 4.14 grams (0.01 mole) of methyl reserpate in fifty milliliters of dry pyridine, the reaction mixture being cooled in an ice bath. The reaction mixture then is maintained at room temperature (from about fifteen to about 35 degrees centigrade) for twenty hours. The mixture then is cooled in an ice bath and a mixture of 100 milliliters of water and fifty grams of ice is added. The resulting organic aqueous mixture is extracted with four 50-milliliter portions of chloroform and the chloroform extracts then washed with four 50-milliliter portions of five percent aqueous potassium hydroxide solution. The aqueous alkaline washes are extracted with one 50-milliliter portion of chloroform. The combined chloroform extracts are washed with two 50-milliliter portions of saturated aqueous salt solution and then dried over anhydrous sodium sulfate. Evaporation of the solvent provides 8.8 grams of crude product which is crystallized from 100 milliliters of methanol and recrystallized from benezene-petroleum ether (boiling point 30 to 60 degrees centigrade) mixture. The purified methyl reserpate - 18 - [α - methyl - β - (3,4,5 - trimethoxyphenyl)]-acrylate melts with decomposition at 239 degrees centigrade.

Analysis—Calc'd for $C_{36}H_{44}N_2O_9$: N, 4.32. Found: N, 4.47.

Substitution of other alkyl reserpates and other α-alkyl-β-(3,4,5-trimethoxyphenyl)-acryloyl chlorides (prepared by known procedure or procedures analogous thereto) wherein the alkyl radicals are the same or different and are, for example, ethyl, propyl, butyl, isobutyl, amyl, hexyl, etc., for the methyl reserpate and α-methyl-β-(3,4,5-trimethoxyphenyl)-acryloyl chloride, respectively, in the foregoing example provides other alkyl reserpate-18-[α-alkyl-β-(3,4,5-trimethoxyphenyl)]-acrylates, for example, methyl reserpate-18-[α-ethyl-β-(3,4,5-trimethoxyphenyl)]-acrylate, ethyl reserpate-18-[α-ethyl-β-(3,4,5-trimethoxyphenyl)]-acrylate, etc., which have utility similar to that of methyl reserpate-18-[α-methyl-β-(3,4,5-trimethoxyphenyl)]-acrylate. Also following the foregoing procedure, but substituting an alkyl deserpidate, alkyl raunescate or alkyl raujemidate, alkyl being defined as above, for the methyl reserpate, there are prepared 18-[α-alkyl-β-(3,4,5-trimethoxyphenyl)]-acrylate esters of the alkyl deserpidate, alkyl raunescate, and alkyl raujemidate, respectively, which esters are useful for the same purpose and employed in the same manner as methyl reserpate-18-[α - methyl - β - (3,4,5-trimethoxyphenyl)] - acrylate. The following examples are illustrative.

Example 2

Following the procedure of Example 1 using methyl deserpidate in place of methyl reserpate, there is obtained methyl deserpidate-18-[α-methyl-β-(3,4,5-trimethoxyphenyl)]-acrylate.

Example 3

Following the procedure of Example 1 using methyl raunescate in place of methyl reserpate, there is obtained methyl raunescate - 18 - [α - methyl - β - (3,4,5 - trimethoxyphenyl)]-acrylate.

Example 4

Following the procedure of Example 1 using methyl raujemidate in place of methyl reserpate, there is obtained methyl raujemidate-18-[α-methyl-β-(3,4,5-trimethoxyphenyl)]-acrylate.

It is to be understood that the invention is not to be limited to the exact details of operation or exact compounds shown and described, as obvious modifications and equivalents will be apparent to one skilled in the art, and the invention is therefore to be limited only by the scope of the appended claims.

This application is a continuation-in-part of our copending application Serial No. 718,449, filed on March 3, 1958, now abandoned.

We claim:
1. Lower-alkyl reserpate-18-[α-methyl-β-(3,4,5-trimethoxyphenyl)]-acrylate.
2. Methyl reserpate-18-[α-methyl-β-(3,4,5-trimethoxyphenyl)]-acrylate.

No references cited.